United States Patent
Ma

(10) Patent No.: US 11,875,933 B2
(45) Date of Patent: Jan. 16, 2024

(54) SWITCHBOARD INCLUDING CURRENT TRANSFORMER

(71) Applicant: LS ELECTRIC CO., LTD., Anyang-si (KR)

(72) Inventor: Ji-Hoon Ma, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 808 days.

(21) Appl. No.: 16/962,437

(22) PCT Filed: Dec. 18, 2018

(86) PCT No.: PCT/KR2018/016093
§ 371 (c)(1),
(2) Date: Jul. 15, 2020

(87) PCT Pub. No.: WO2019/164114
PCT Pub. Date: Aug. 29, 2019

(65) Prior Publication Data
US 2021/0065972 A1 Mar. 4, 2021

(30) Foreign Application Priority Data
Feb. 23, 2018 (KR) .......................... 10-2018-0021994

(51) Int. Cl.
*H01F 38/30* (2006.01)
*H01F 27/02* (2006.01)
(Continued)

(52) U.S. Cl.
CPC ............. *H01F 38/30* (2013.01); *H01F 27/02* (2013.01); *H01F 27/363* (2020.08); *H02B 13/0356* (2013.01)

(58) Field of Classification Search
CPC ....... H01B 17/26; H01B 17/583; H01F 27/02; H01F 27/04; H01F 27/363; H01F 38/30;
(Continued)

(56) References Cited

U.S. PATENT DOCUMENTS 4,679,625 A * 7/1987 Gibbons ................ C09K 8/512
166/270
5,295,041 A * 3/1994 Metivier ................... H02B 1/21
361/829
(Continued)

FOREIGN PATENT DOCUMENTS

CA 989057 A 5/1976
CN 102637550 A 8/2012
(Continued)

OTHER PUBLICATIONS

Extended European Search Report for related European Application No. 18906974.3; action dated Feb. 22, 2021; (9 pages).
(Continued)

*Primary Examiner* — Vinh P Nguyen
(74) *Attorney, Agent, or Firm* — K&L Gates LLP

(57) ABSTRACT

A switchboard is provided via a terminal bushing; a switchboard terminal coupled to the terminal bushing; a metering transformer bushing which is installed or released from the front part thereof through a breaker chamber, covers the switchboard terminal, and is inserted into the terminal bushing; and a metering transformer which is fastened to the metering transformer bushing and disposed on the outer circumference of the metering transformer bushing. The metering transformer includes at least one terminal that faces forward, and the metering transformer bushing may include an opening for exposing the at least one terminal to the front thereof.

13 Claims, 15 Drawing Sheets

(51) Int. Cl.
*H02B 13/035* (2006.01)
*H01F 27/36* (2006.01)

(58) Field of Classification Search
CPC ........... H01F 6/06; H02B 11/04; H02B 11/26; H02B 13/0356; H02B 1/306
See application file for complete search history.

(56) References Cited

U.S. PATENT DOCUMENTS

| | | | |
|---|---|---|---|
| 6,489,782 B1 | 12/2002 | Baier et al. | |
| 7,964,799 B2* | 6/2011 | Isberg | H01F 27/04 16/2.2 |
| 8,779,319 B2 | 7/2014 | Yang et al. | |
| 8,913,370 B2* | 12/2014 | Smith | H05K 5/0217 200/305 |
| 9,601,912 B2* | 3/2017 | Motley | H01F 27/04 |
| 9,620,938 B2* | 4/2017 | Yang | H02B 11/26 |
| 9,620,940 B2 | 4/2017 | Motta | |
| 10,587,098 B2* | 3/2020 | Johnson | H02B 1/306 |
| 2015/0244156 A1* | 8/2015 | Kutalek | H02B 11/04 174/668 |

FOREIGN PATENT DOCUMENTS

| | | |
|---|---|---|
| CN | 103683070 A | 3/2014 |
| CN | 204361566 U | 5/2015 |
| CN | 204516569 U | 7/2015 |
| EP | 3029789 A1 | 6/2016 |
| JP | S57134835 U | 8/1982 |
| JP | S6035507 A | 2/1985 |
| JP | H04181615 A | 6/1992 |
| JP | H09231843 A | 9/1997 |
| JP | 2001103619 A | 4/2001 |
| JP | 2007037358 A | 2/2007 |
| KR | 200461872 Y1 | 8/2012 |
| KR | 20130119500 A | 10/2013 |
| KR | 20160066965 A | 6/2016 |

OTHER PUBLICATIONS

Chinese Office Action for related Chinese Application No. 201880086595.3; action dated Jul. 5, 2021; (8 pages).
Chinese Notice of Allowance for related Chinese Application No. 201880086595.3; action dated Apr. 20, 2022; (8 pages).
International Search Report for related International Application No. PCT/KR2018/016093; report dated Aug. 29, 2019; (5 pages).
Written Opinion for related International Application No. PCT/KR2018/016093; report dated Aug. 29, 2019; (5 pages).

* cited by examiner

[FIG. 1]    PRIOR ART
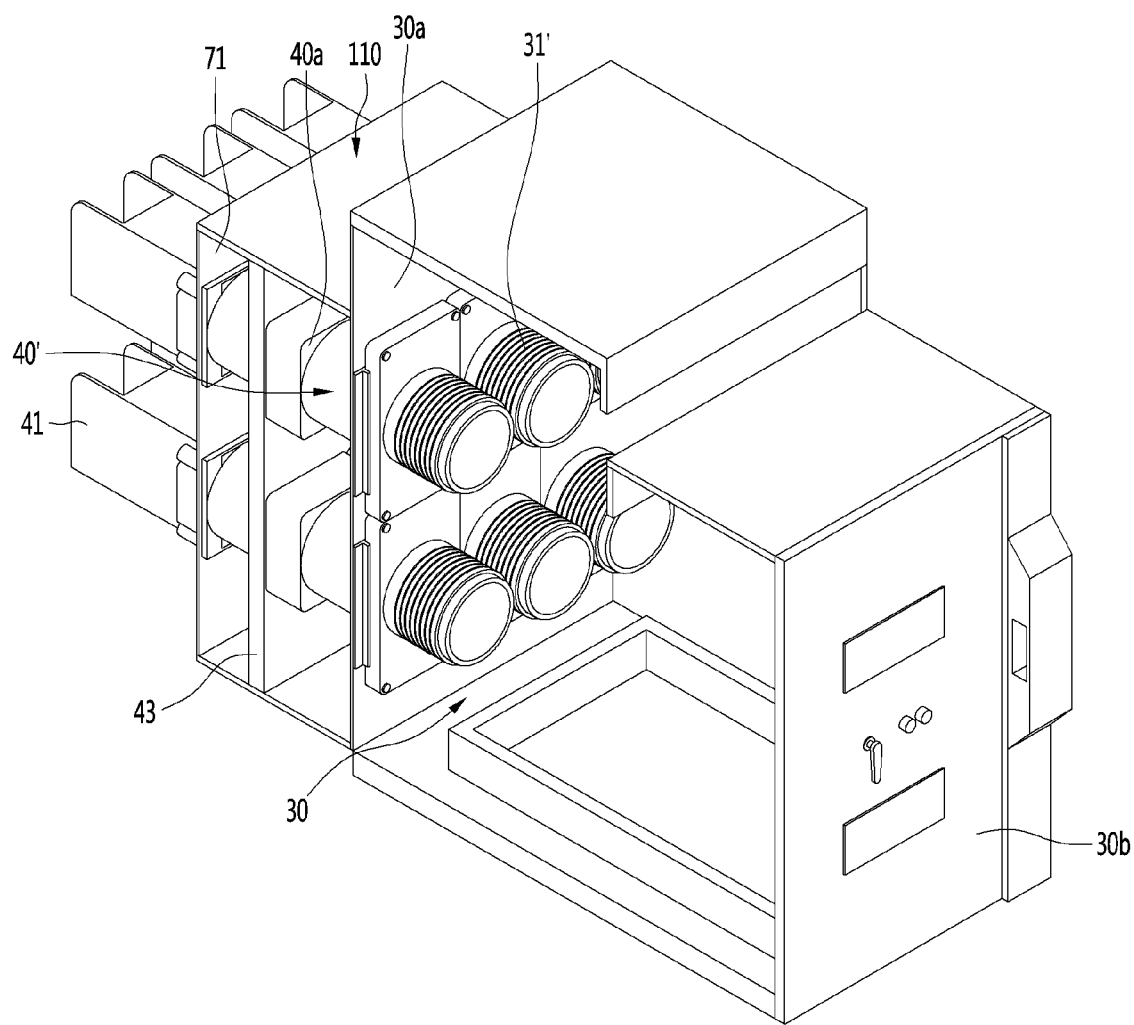

[FIG. 2]    PRIOR ART
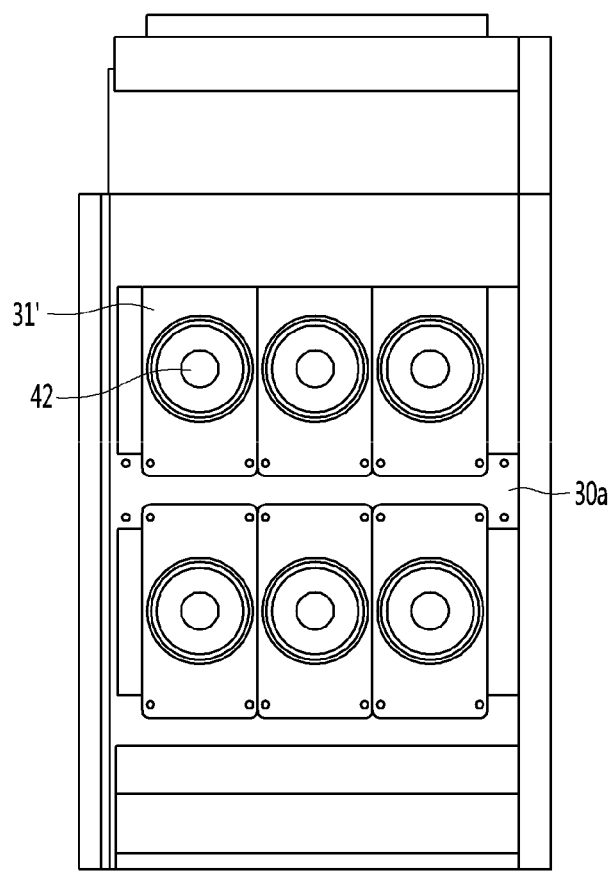

[FIG. 3]  PRIOR ART
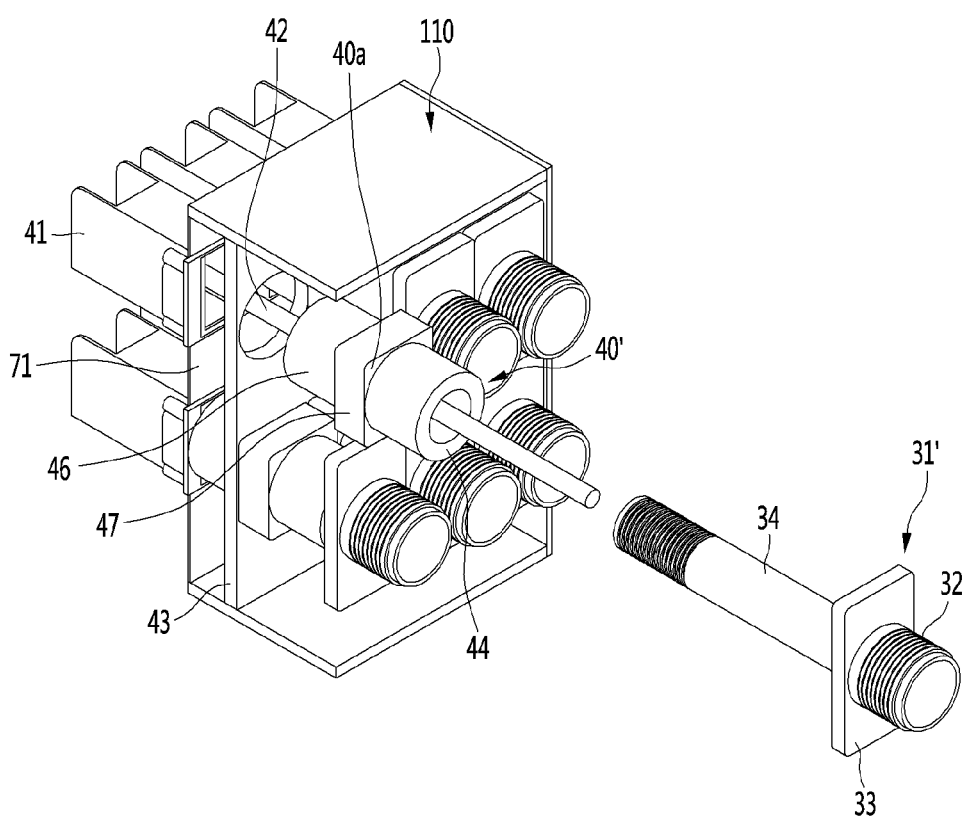

[FIG. 4]
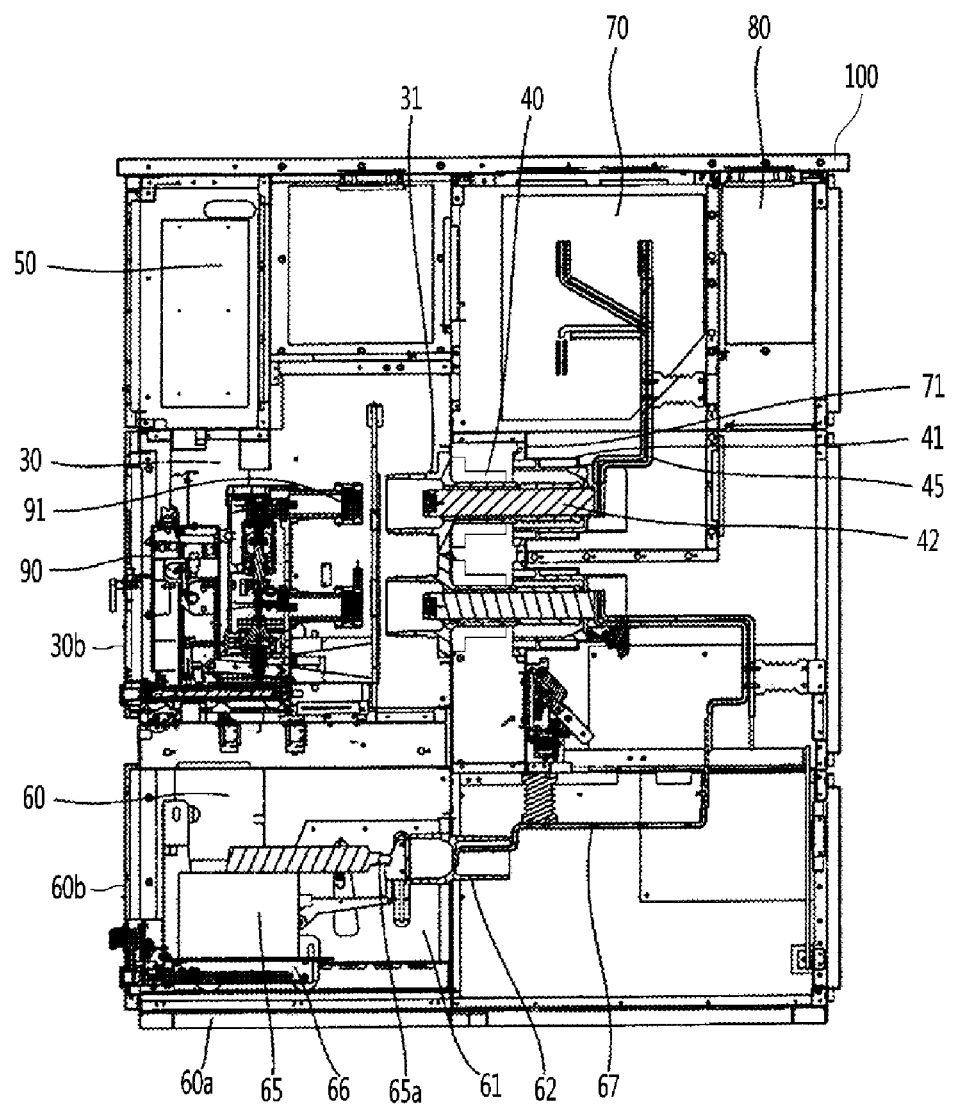

[FIG. 5]
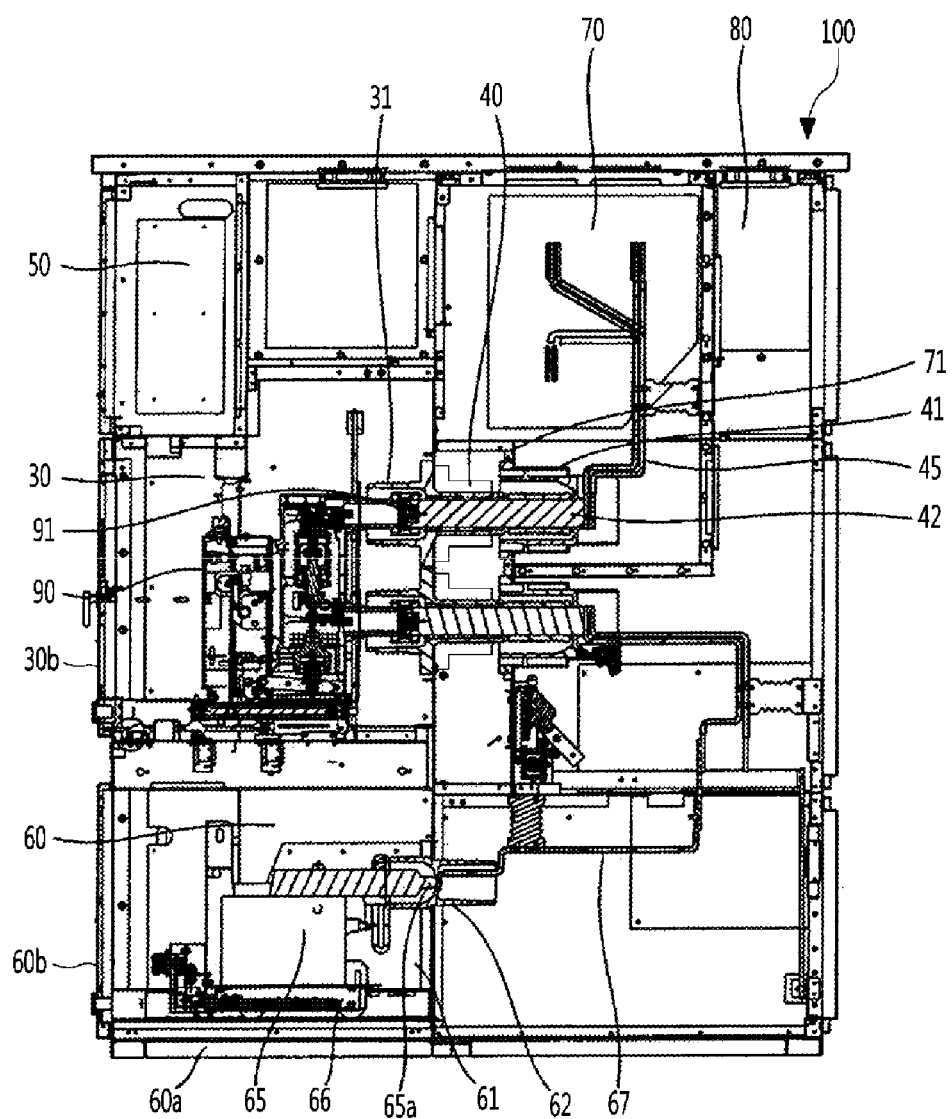

[FIG. 6]
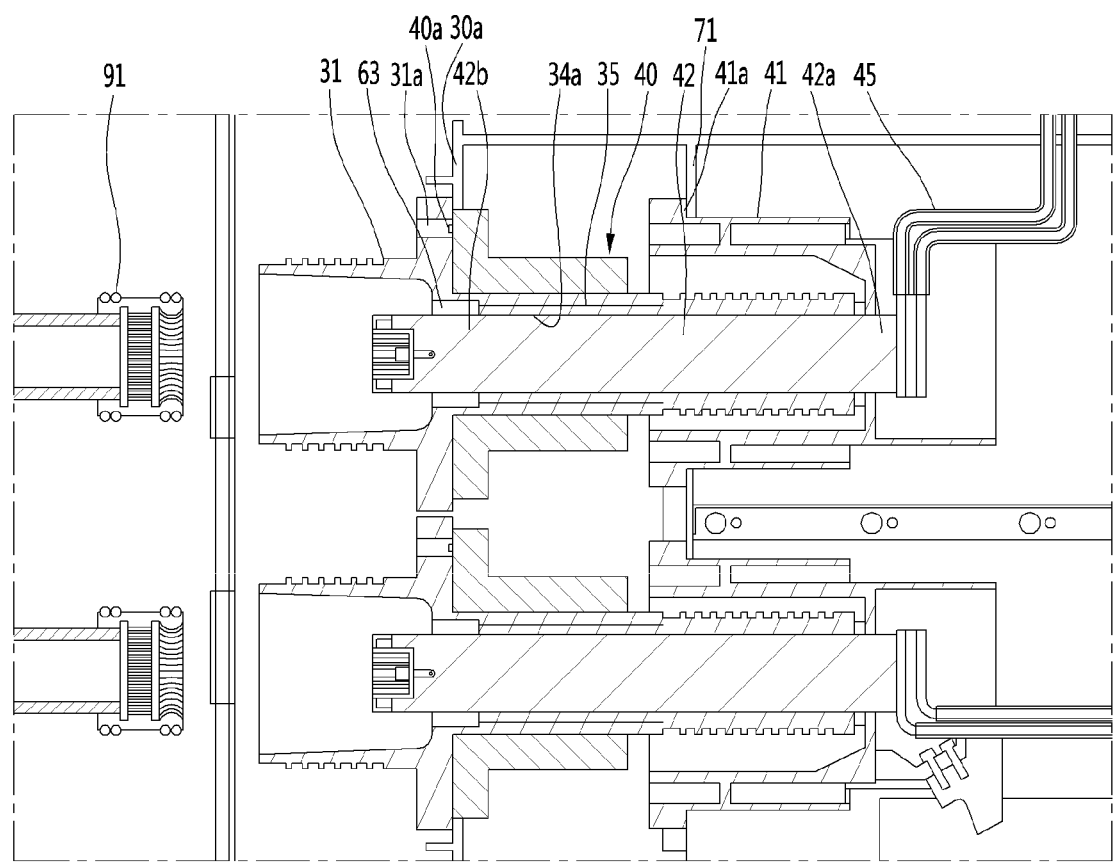

[FIG. 7]
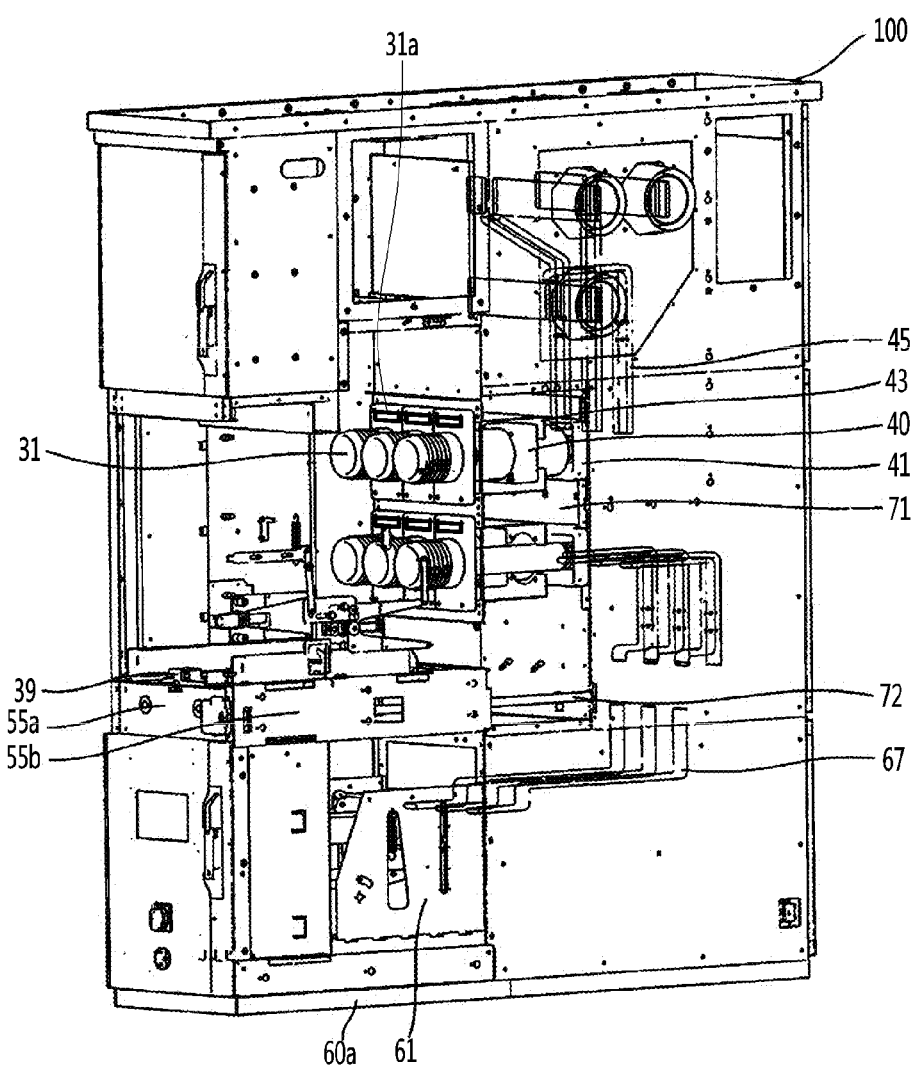

[FIG. 8]
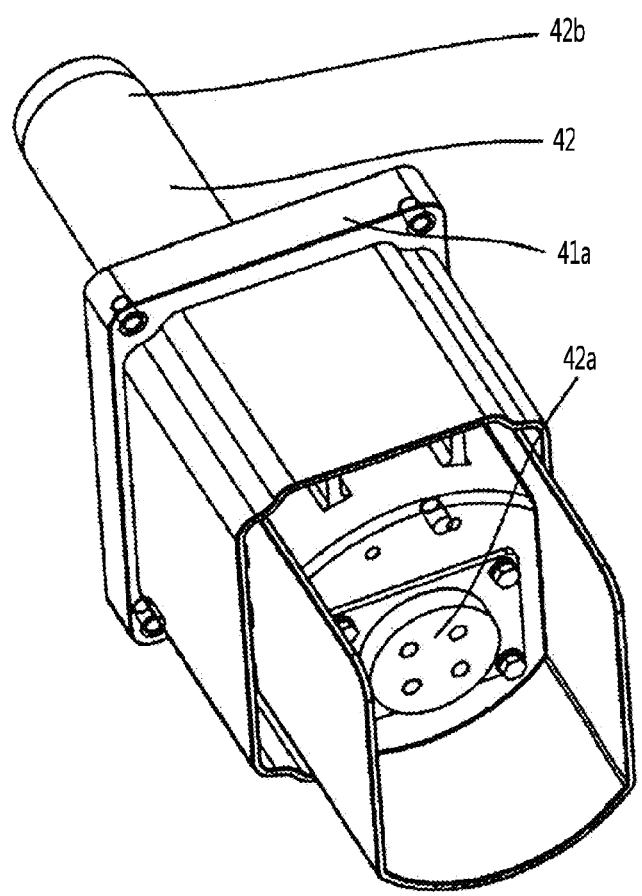

[FIG. 9]
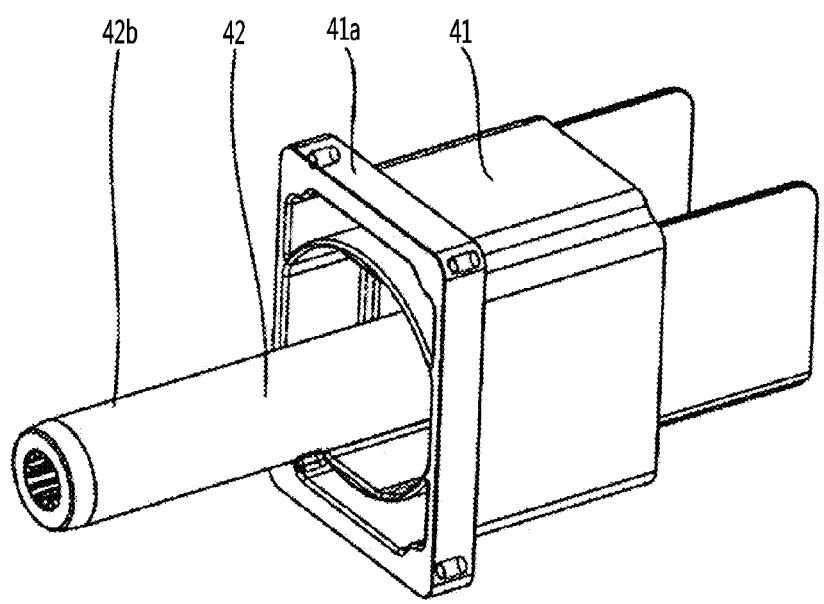

[FIG. 10]
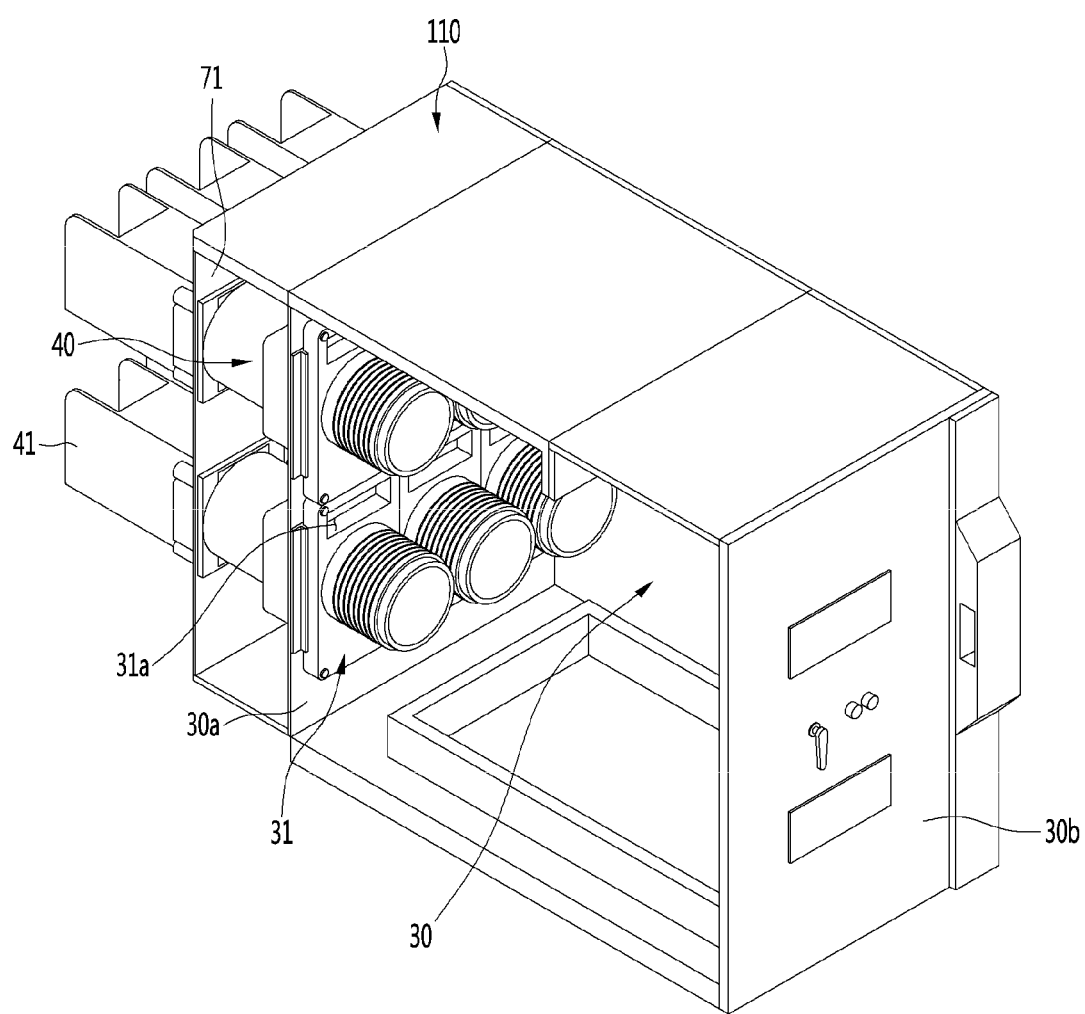

[FIG. 11]
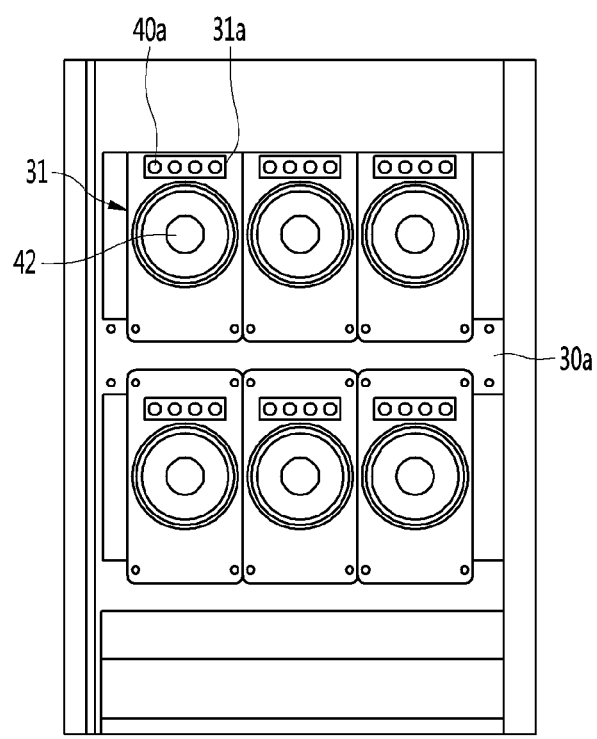

[FIG. 12]
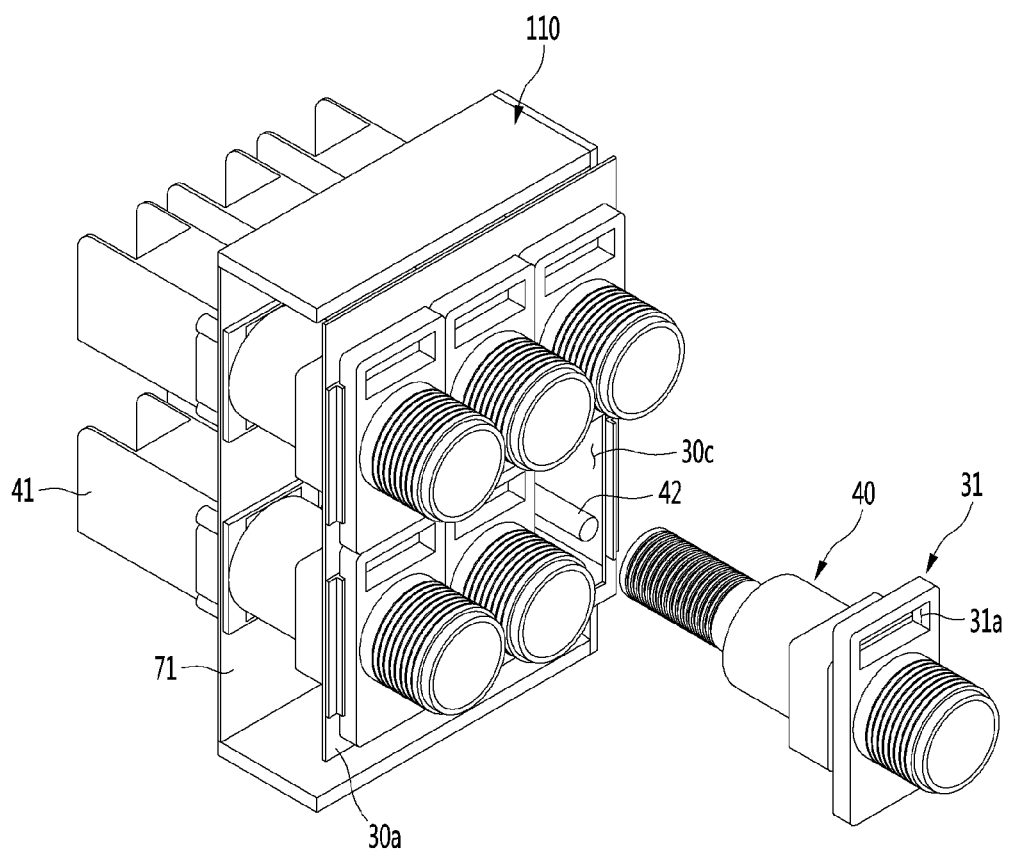

【FIG. 13】
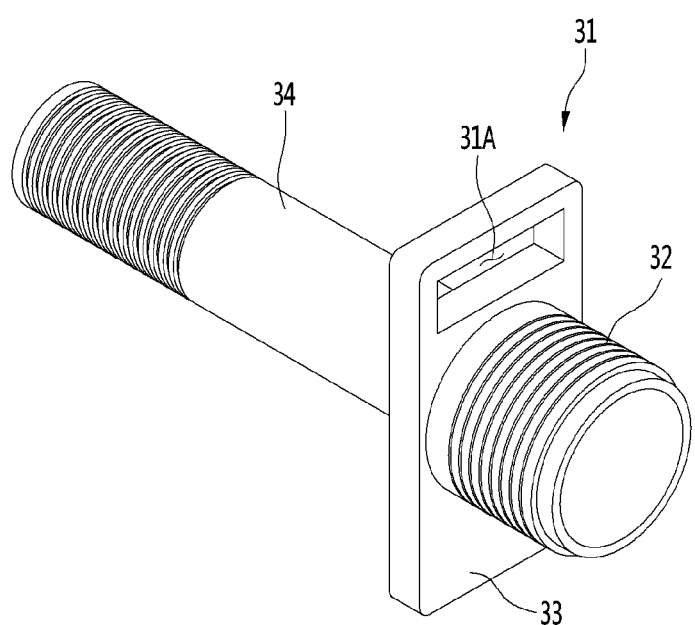

[FIG. 14]
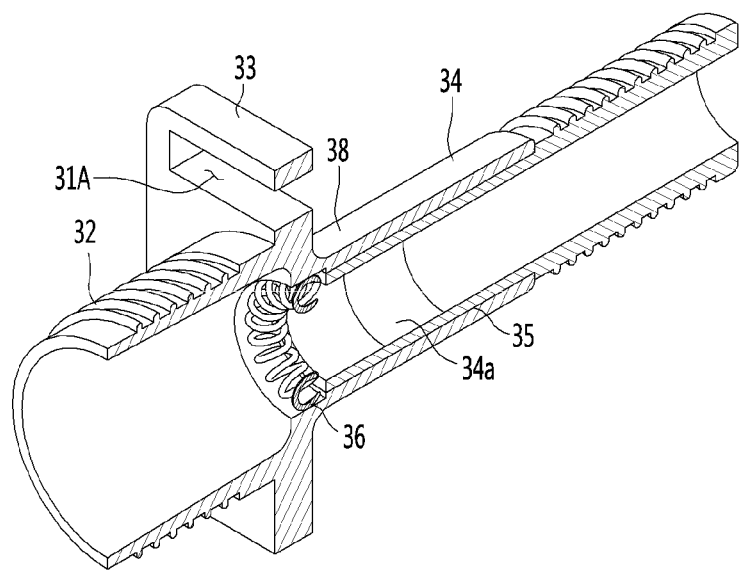
[FIG. 15]
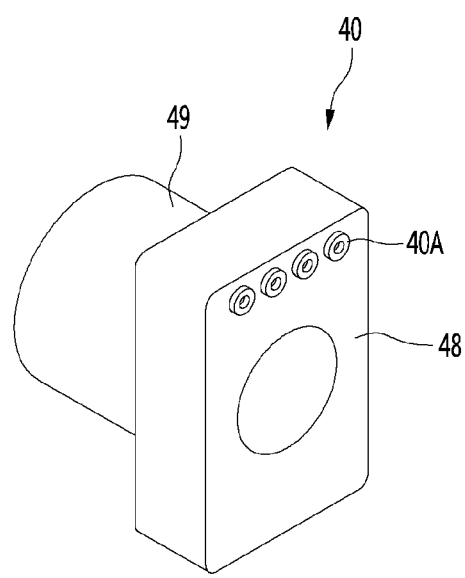

[FIG. 16]
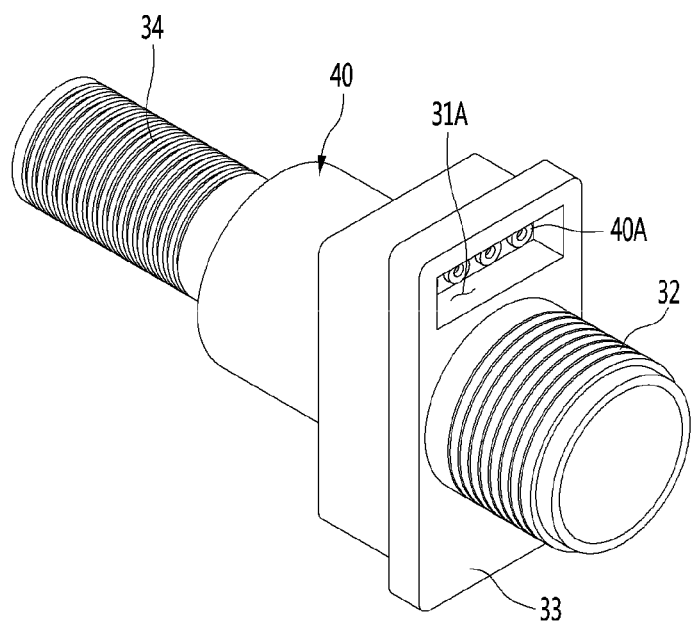
[FIG. 17]
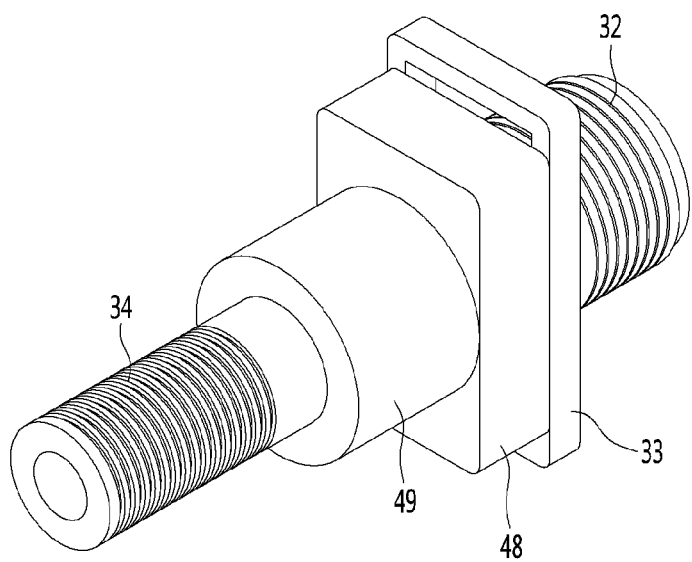

SWITCHBOARD INCLUDING CURRENT TRANSFORMER

CROSS-REFERENCE TO RELATED APPLICATIONS

The present application is a National Stage of International Application No. PCT/KR2018/016093, filed on Dec. 18, 2018, which claims the benefit of earlier filing date and right of priority to Korean Application No. 10-2018-0021994 filed on Feb. 23, 2018, the contents of which are all hereby incorporated by reference herein in their entirety.

FIELD OF THE INVENTION

The present disclosure relates to a switchboard, and more particularly, to a switchboard having a bushing-coupled current transformer in which a current transformer and a current transformer bushing are installed.

BACKGROUND OF THE INVENTION

In general, a switchboard refers to a device used for monitoring, controlling, and protecting a power grid. This switchboard contains therein various electrical devices such as a circuit breaker and a current transformer for operating or controlling a power plant and a substation, and for operating an electric motor.

Among the electrical devices contained in the switchboard, devices mounted to a front portion thereof may be maintained while an operator is located in front of the switchboard. However, it may be difficulty for the operator to maintain devices mounted to a rear portion thereof. In other that the operator maintains the devices mounted to the rear portion, a space for maintenance between the rear portion of the switchboard and a rear wall thereof should be secured in a certain volume or the operator enters an interior of the switchboard through the front portion.

The switchboard stores various devices therein and supplies voltage and current thereto, detects an abnormality when an accidental voltage or current occurs, cuts off the circuit breaker or provides the abnormality information to other control devices.

The switchboard has a plurality of compartments defined therein to accommodate the various devices, and the plurality of compartments correspond to various functions. Each compartment should have shielding and insulation performance as prescribed under regulations.

FIG. 1 is a perspective view of a state in which a current transformer and a current transformer bushing according to a prior art are installed in a circuit breaker compartment from which a circuit breaker is removed. FIG. 2 shows a front view of a states in which a current transformer and a current transformer bushing according to a prior art are installed in a circuit breaker compartment from which a circuit breaker is removed. FIG. 3 is a view for illustrating a coupling relationship between the current transformer and the current transformer bushing shown in FIG. 1.

The compartments of the switchboard includes a circuit breaker compartment 30 in which a circuit breaker is stored. A circuit breaker compartment door 30b that opens and closes the circuit breaker compartment may be installed at a front face of the circuit breaker compartment 30. The operator may open the circuit breaker compartment door 30b and withdraw the circuit-breaker (not shown) forwards, and then may maintain a current transformer bushing 31' and a current transformer 40' while the operator is located in front of the switchboard.

An enclosure 110 may be mounted to a rear face of the circuit breaker compartment 6. The enclosure 110 may have a box shape. A front face of the enclosure 110 may constitute at least a portion of a rear plate 30a of the circuit breaker compartment 30.

Further, the switchboard may include a current transformer mounter 43 on which the current transformer 40' is mounted and supported, and a terminal bushing mounter 71 on which a terminal bushing 41 is mounted and supported.

The terminal bushing mounter 71 may be disposed on the rear plate of the circuit breaker compartment 30.

The current transformer mounter 43 may be located behind the rear plate 30a of the circuit breaker compartment 30. The terminal bushing mounter 71 may be located behind the current transformer mounter 43.

The terminal bushing 41 may be formed in a box shape having one open side. The terminal bushing 41 may have a flange on one side thereof and may be coupled to the terminal bushing mounter 71. The terminal bushing 41 may be inserted into the terminal bushing mounter 71 in a direction from a front face to a rear face.

A switchboard terminal 42 may extend in an elongate longitudinal direction and in a front-rear direction. The switchboard terminal 42 may include one end connected to a power supply-connected bus bar and the other end in contact with the current transformer bushing 31' in a supported manner.

One end of the switchboard terminal 42 may penetrate the terminal bushing 41. The one end of the switchboard terminal 42 may be connected to and may be in contact with the power supply-connected busbar.

Hereinafter, the current transformer bushing 31' and the current transformer 40' according to the prior art are illustrated.

The current transformer bushing 31' may be inserted from a front position of the rear plate 30a of the circuit breaker compartment 30 into the circuit breaker compartment 30. A current transformer bushing through-hole into which the current transformer bushing 31' is inserted may be formed in the rear plate 30a of the circuit breaker compartment 30.

The switchboard terminal 42 may be accommodated in the current transformer bushing 31'.

The current transformer bushing 31' may include a bushing head 32, a bushing wing 33 and a bushing body 34.

A terminal of the circuit breaker may be inserted into the bushing head 32 and may be connected to the switchboard terminal 42. The switchboard terminal 42 may extend to have a length sized such that the switchboard terminal 42 is connected to the terminal of the circuit breaker when the circuit breaker is in an operation position.

The bushing wing 33 may be located behind the bushing head 32. The bushing wing 33 may be fastened to the rear plate 30a of the circuit breaker compartment 30, and may be located in front of the current transformer 40'.

The bushing body 34 may extend from the bushing wing 33 in a rear direction, and may have a diameter smaller than a diameter of the bushing head 32. A hollow inside the bushing body 34 may communicate with a hollow inside the bushing head 32.

The current transformer 40' may surround an outer circumference of the current transformer bushing 3, more specifically, an outer circumference of the bushing body 34. The current transformer 40' may be disposed inside the enclosure 110.

The current transformer 40' may include a first hollow portion 44, a second hollow portion 46 and a flange 47. The flange 47 may be located between the first hollow portion 44 and the second hollow portion 46.

Further, a terminal 40*a* may be disposed on the flange 47. More specifically, the terminal 40*a* may be disposed on a front face of flange 47.

Hereinafter, a method of assembling the current transformer bushing 31' and the current transformer 40' according to the prior art is described.

The enclosure 110 is mounted on the rear face of the circuit breaker compartment 30. The terminal bushing 41 may be mounted to the terminal bushing mounter 71 formed on a back face of the enclosure 110 through the circuit breaker compartment 30.

Then, the current transformer mounter 43 may be mounted inside the enclosure 110. The current transformer 40' may be fixed to the current transformer mounter 43 so that the switchboard terminal 42 penetrates the current transformer 40'. The current transformer 40' may be inserted through the circuit breaker compartment 30. The current transformer 40' may be mounted on the current transformer mounter 43 via a fastening member such as a bolt.

Thereafter, the current transformer bushing 31' may pass through the circuit breaker compartment 30 and an inner opening of the current transformer mounter 43 and may be mounted in the circuit breaker compartment 30.

When using the above configuration, the conventional switchboard has a problem in that even when the circuit breaker is removed, the current transformer 40', more specifically, the terminal 40*a* of the current transformer 40' is screened with the current transformer bushing 31' and thus is not exposed to the operation in front of the switchboard. Therefore, in order for the operator to identify and check the current transformer 40', the operator should disassemble and reassemble the current transformer bushing 31'. This is inconvenient.

Further, as the current transformer bushing 31' and current transformer 40' have to be assembled separately, the assembly process is inconvenient and the assembly time is large. Further, a length in the front-rear direction of the current transformer 40' is relatively large, and thus an entire length in the front-rear direction of the switchboard increases.

BRIEF SUMMARY OF THE INVENTION

A purpose of the present disclosure is to provide a switchboard in which the terminal of the current transformer is exposed to the operator without removing the current transformer bushing.

In one aspect of the present disclosure, there is provided a switchboard having a bushing-coupled current transformer, the switchboard comprising: a switchboard terminal; a current transformer bushing mounted to or removed from the switchboard through a circuit breaker compartment in a direction from a front face of the switchboard terminal to a rear face thereof, wherein the current transformer bushing surrounds the switchboard terminal; and a current transformer coupled to the current transformer bushing, wherein the current transformer surrounds an outer circumference face of the current transformer bushing, wherein the current transformer has at least one terminal facing in a front direction, wherein the current transformer bushing has an opening exposing the at least one terminal in the front direction.

The current transformer bushing may include: a bushing head; a bushing wing located in rear of the bushing head and having the opening defined therein; and a bushing body extending rearwards from the bushing wing.

The opening may face a top or bottom face of the bushing head.

The current transformer may include: a flange on which the at least one terminal may be disposed; and a hollow portion extending rearwards from the flange, wherein a portion of the bushing body may be accommodated in the hollow portion.

The flange may be fastened to the bushing wing.

The at least one terminal may be disposed on a front face of the flange, wherein the front face of the flange contacts a rear face of the bushing wing.

The bushing body may receive therein an electrical field-reducing sealed member, and a guide spring connected to the electrical field-reducing sealed member.

The guide spring may be disposed at a front end of the bushing body.

The guide spring may contact the switchboard terminal to fix a position of the switchboard terminal.

The at least one terminal and the opening may overlap each other in a front-rear direction.

A current transformer bushing coupler may be formed in or on a rear plate of the circuit breaker compartment, and the current transformer bushing may be fastened to the current transformer bushing coupler.

While the current transformer bushing is coupled to the current transformer, the current transformer bushing may be inserted into a terminal bushing through the circuit breaker compartment in a direction from a front face of the switchboard terminal to a rear face thereof.

The bushing wing may protrude from the bushing head and may constitute a flange.

In another aspect of the present disclosure, there is provided a bushing-coupled current transformer comprising: a flange having at least one terminal disposed on a front face thereof, wherein the flange contacts a bushing wing of a current transformer bushing; and a hollow portion extending rearwards from the flange, wherein at least a portion of a bushing body of the current transformer bushing may be accommodated in the hollow portion.

In still another aspect of the present disclosure, there is provided a current transformer bushing comprising: a bushing head; a bushing wing located in rear of the bushing head and having an opening defined therein exposing a terminal of a bushing-coupled current transformer in a front direction; and a bushing body extending rearwards from the bushing wing.

According to the preferred embodiment according to the present disclosure, when the circuit breaker is withdrawn from the circuit breaker compartment of the switchboard, the terminal of the current transformer is directly exposed to an operator in front of the switchboard through the opening of the current transformer bushing. Thus, the wirings of the current transformer may be easily mounted, removed, and inspected.

Further, the current transformer and the current transformer bushing are fastened to each other to form an assembly. Then, the assembly may be inserted into the circuit-breaker compartment. Thus, the assembly time may be shortened and the assembly performance may be greatly improved.

Further, the flange of the current transformer contacts and is coupled to the bushing wing of the current transformer bushing. Thus, a length in the front-rear direction the assembly between the current transformer and the current transformer bushing may be smaller than that in the prior art.

Thus, an entire length in the front and rear direction of the switchboard may be shortened, and space efficiency and economic efficiency may be improved.

BRIEF DESCRIPTION OF THE DRAWINGS

FIG. 1 is a perspective view of a state in which a current transformer and a current transformer bushing according to a prior art are installed in a circuit breaker compartment from which a circuit breaker is removed.

FIG. 2 shows a front view of a states in which a current transformer and a current transformer bushing according to a prior art are installed in a circuit breaker compartment from which a circuit breaker is removed.

FIG. 3 is a view for illustrating a coupling relationship between the current transformer and the current transformer bushing shown in FIG. 1.

FIG. 4 is a cross-sectional view of a switchboard when a circuit breaker and a transformer of a switchboard according to the present disclosure are in a test position.

FIG. 5 is a cross-sectional view of a switchboard when a circuit breaker and a transformer of a switchboard according to an embodiment of the present disclosure are in an operation position.

FIG. 6 is an enlarged cross-sectional view of a terminal bushing, a switchboard terminal, a current transformer bushing, and a current transformer as shown in FIG. 4.

FIG. 7 is a perspective view showing an interior of the switchboard according to an embodiment of the present disclosure.

FIG. 8 is a rear perspective view of a terminal bushing of a switchboard according to an embodiment of the present disclosure.

FIG. 9 is a front perspective view of a terminal bushing of a switchboard according to an embodiment of the present disclosure.

FIG. 10 is a perspective view of a state in which a current transformer and a current transformer bushing are installed in a circuit breaker compartment from which a circuit breaker is removed, according to one embodiment according to the present disclosure.

FIG. 11 is a front view of a state in which a current transformer and a current transformer bushing are installed in a circuit breaker compartment from which a circuit breaker is removed, according to one embodiment according to the present disclosure.

FIG. 12 is a block diagram showing a combination relationship of a current transformer and a current transformer bushing shown in FIG. 10.

FIG. 13 is a perspective view of a current transformer bushing according to an embodiment according to the present disclosure.

FIG. 14 is a cut-away perspective view of a current transformer bushing shown in FIG. 13.

FIG. 15 is a perspective view of a current transformer according to an embodiment according to the present disclosure.

FIG. 16 is a front perspective view of a state in which a current transformer bushing is combined with a current transformer, according to one embodiment according to the present disclosure.

FIG. 17 is a rear perspective view of a state in which a current transformer bushing is combined with a current transformer, according to one embodiment according to the present disclosure.

DETAILED DESCRIPTION OF THE INVENTION

Hereinafter, a preferred embodiment of the present disclosure will be described with reference to the accompanying drawings. The embodiment is intended to allow the skilled person to the art to easily implement the disclosure and not to limit technical ideas and categories of the present disclosure.

A switchboard having a bushing-coupled current transformer according to an embodiment of the present disclosure is described with reference to the drawings. The same components as those in FIG. 1 to FIG. 3 as described above have the same reference numerals as those in FIG. 1 to FIG. 3 as described above. This may not intend that following components belong to the prior art.

A switchboard having a bushing-coupled current transformer according to an embodiment according to the present disclosure may include a terminal bushing 41, a switchboard terminal 42 coupled to the terminal bushing 41, a current transformer bushing 31 installed or removed in or from the circuit breaker compartment 30 by an operator in front of the switchboard, and surrounding the switchboard terminal 42 and being inserted into the terminal bushing 41, and a current transformer 40 fastened to the current transformer bushing 31, and surrounding an outer circumference of the current transformer bushing 31. The current transformer 40 may have least one terminal 40a facing forwards. An opening 31a exposing the at least one terminal to the operator in front of the switchboard may be formed in the current transformer bushing 31.

Hereinafter, the switchboard having the bushing-coupled current transformer is referred to as a switchboard for convenience.

FIG. 4 is a cross-sectional view of a switchboard when a circuit breaker and a transformer of a switchboard according to the present disclosure are in a test position. FIG. 5 is a cross-sectional view of a switchboard when a circuit breaker and a transformer of a switchboard according to an embodiment of the present disclosure are in an operation position. FIG. 6 is an enlarged cross-sectional view of a terminal bushing, a switchboard terminal, a current transformer bushing, and a current transformer as shown in FIG. 4. FIG. 7 is a perspective view showing an interior of the switchboard according to an embodiment of the present disclosure. FIG. 8 is a rear perspective view of a terminal bushing of a switchboard according to an embodiment of the present disclosure. FIG. 9 is a front perspective view of a terminal bushing of a switchboard according to an embodiment of the present disclosure.

The switchboard may have a plurality of compartments defined therein. The plurality of compartments may include a circuit breaker compartment 30 in which a circuit-breaker 90 is stored, a low-voltage device compartment 50 in which a low-voltage device is accommodated, a transformer compartment 60 in which a power transformer is accommodated, a bus compartment 70 through which a bus passes, and a cable compartment 80 into a withdrawable bus or cable is inserted.

The switchboard may be constructed such that the circuit breaker compartment 30, the low-voltage device compartment 50, the transformer compartment 60, the bus compartment 70 and the cable compartment 80 are partitioned from each other.

The switchboard may include a casing 100 forming an exterior appearance thereof. The casing 100 may have a front opening. Various components inside the switchboard may be accessed through the front opening of the casing 100 by the operator.

The casing 100 may be embodied as an assembly of at least two members. In one example, the casing 100 may have a door to be opened and closed as required. The casing 100 may include a lower body, a rear body, a pair of side bodies, and an upper body. At least one of the lower body, the rear body, the pair of side bodies, and the upper body may be embodied as an assembly of a plurality of members.

The casing 100 may have the circuit breaker compartment 30 in which the circuit-breaker 90 may be stored. The casing 100 may have the low-voltage device compartment 50 in which a low-voltage device is stored. The casing 100 may have the transformer compartment 60 in which the power transformer is housed. The casing 100 may have the bus compartment 70 through which the bus pass. The casing 100 may have the cable compartment 80 into which a drawable bus or cable is inserted.

In one example, the switchboard may include at least one front door that opens and closes the front opening. The at least one front door may include a circuit breaker compartment door 30b that opens and closes the circuit breaker compartment 30 and a transformer compartment door 60b that opens and closes the transformer compartment 60. The at least one front door may further include a low-voltage device compartment door that opens and closes the low-voltage device compartment 50.

An interior each of the circuit breaker compartment 30, the transformer compartment 60, and the low-voltage device compartment 50 may be visible to the operator when the front door is opened. The operator may open the circuit breaker compartment door 30b and withdraws the circuit-breaker 90, or may open the transformer compartment door 60b and withdraw the power transformer.

As shown in FIG. 4, when the circuit-breaker 90 is in a test position in the circuit breaker compartment 30, voltage and current may not flow between a power supply and a load. As shown in FIG. 5, when the circuit-breaker 90 is in an operation position, current and voltage may flow therebetween. That is, the circuit-breaker 90 may enable or disable the current flow.

The circuit-breaker 90 may move to the test position or the operation position via a withdrawable handle (not shown).

When the circuit-breaker 90 is in the test position, a main circuit terminal 91 of the circuit breaker may be located outside the current transformer bushing 31 and may be disconnected from the switchboard terminal 42.

When the circuit-breaker 90 is in the operation position, the main circuit terminal 91 of the circuit breaker may be inserted into the current transformer bushing 31 and be connected to the switchboard terminal 42.

The current transformer 40 may have a hollow defined therein surrounding a portion of the current transformer bushing 31. The current transformer 40 may surround an outer circumference of the current transformer bushing 31. The current transformer bushing 31 may be constructed such that a portion thereof is inserted into the hollow of the current transformer 40.

When the current transformer 40 is mounted on the switchboard, the transformer 40 may be mounted thereon in a direction from a front face to a rear face of the switchboard. The current transformer 40 may be removed from a rear portion of the switchboard in a forward direction when being detached from the switchboard. That is, the current transformer 40 may be detached in the front-rear direction.

The switchboard may include a terminal bushing mounter 71 on which the terminal bushing 41 is mounted. The terminal bushing mounter 71 may be disposed inside at least one of the bus compartment 70 or the cable compartment 80. The terminal bushing 41 may be installed on the terminal bushing mounter 71. The terminal bushing 41 may be supported on the terminal bushing mounter 71. The terminal bushing mounter 71 may be located behind a rear plate 30a of the circuit breaker compartment 30. A horizontal support bar 72 may be installed below the terminal bushing mounter 71.

The rear plate 30a of the circuit breaker compartment 30 may partition the circuit breaker compartment 30 from another space behind the circuit breaker compartment 30. The rear plate 30a of the circuit breaker compartment 30 may vertically extend in an elongate manner and inside the casing 100.

An enclosure 110 may be installed on a rear face of the circuit breaker compartment 30. The enclosure 110 may be disposed inside the bus compartment 70 and may have an approximately box shape.

The current transformer 40 may be disposed inside the enclosure 110. Inside the enclosure 110, a current transformer supporter (not shown) supporting the current transformer 40 thereon may be disposed.

A front face of the enclosure 110 may constitute at least a portion of the rear plate 30a of the circuit breaker compartment 30. A rear face of the enclosure 110 may constitute the terminal bushing mounter 71.

The terminal bushing mounter 71 may maintain a position of the terminal bushing 41.

The terminal bushing 41 may be formed in an open box shape having one open side. A flange 41a may be formed on one side of the terminal bushing 41. Thus, the terminal bushing 41 may be coupled to the terminal bushing mounter 71. The terminal bushing 41 may be inserted into the terminal bushing mounter 71 in a direction from a front to a rear.

The terminal bushing mounter 71 may have a terminal bushing through-hole into which the terminal bushing 41 is inserted.

When the terminal bushing 41 is mounted on the terminal bushing mounter 71, the flange 41a may be blocked by a portion of the mounter 71 around the terminal bushing through-hole. When the flange 41a is blocked by the terminal bushing mounter 71, insertion of the terminal bushing 41 may be completed. The terminal bushing 41 may be mounted on the terminal bushing mounter 71 and supported on the terminal bushing mounter 71.

The switchboard terminal 42 may extend in an elongate manner in an longitudinal direction and in the front-rear direction. The switchboard terminal 42 may include a power supply-connected bus bar contact connected to a power supply-connected bus bar 45, and a current transformer bushing in contact with and supported on the current transformer bushing 31. Hereinafter, the power supply-connected bus bar contact is referred to as one end 42a of the switchboard terminal 42. The current transformer bushing contact is referred to as the other end 42b of the switchboard terminal 42.

One end 42a of the switchboard terminal 42 may pass through the terminal bushing 41. One end 42a of the switchboard terminal 42 passing through the terminal bushing 41 may be in contact with and connected to the power supply-connected bus bar 45.

The power supply-connected bus bar 45 may be disposed in the bus compartment 70.

In one example, an interference-preventing through-hole 30c (see FIG. 12) that prevents the rear plate 30a of the circuit breaker compartment 30 from interference with the current transformer 40 may be formed in the rear plate 30a of the circuit breaker compartment 30. The current transformer 40 may be inserted into the enclosure 110 from the front face of the switchboard through the interference-preventing through-hole 30c.

Because the current transformer 40 is fastened to and supported on the current transformer bushing 31, the switchboard according to the present disclosure may not include a separate current transformer mounter. A connection relationship between the current transformer 40 and the current transformer bushing 31 will be described in detail later.

The current transformer bushing 31 may be inserted from a position in front of the rear plate 30a of the circuit breaker compartment 30, and may be installed on the rear plate 30a of the circuit breaker compartment 30. That is, a current transformer bushing coupler to which the current transformer bushing 31 is fastened may be formed on the rear plate 30a of the circuit breaker compartment 30. The current transformer bushing coupler may be embodied as a hole to which a bolt or the like is fastened.

When the current transformer bushing 31 is mounted on the rear plate 30a of the circuit breaker compartment 30, a bushing wing 33 (see FIG. 13) protruding from the current transformer bushing 31 may be blocked by the rear plate 30a of the circuit breaker compartment 30. When the bushing wing 33 is blocked by the rear plate 30a of the circuit breaker compartment 30, the insertion of the current transformer bushing 31 may be completed.

A fastening member such as a bolt may penetrate both of the current transformer bushing 31 and the current transformer bushing coupler, thereby fixing the current transformer bushing 31 to the rear plate 30a of the circuit breaker compartment 30. The current transformer bushing 31 may be mounted on the rear plate 30a of the circuit breaker compartment 30 and may be supported on the rear plate 30a of the circuit breaker compartment 30.

In one example, a power transformer 65 does not measure a voltage when the transformer 65 is in a test position in the transformer compartment 60 as shown in FIG. 4. As shown in FIG. 5, when the power transformer 65 is in the operation position, the power transformer 65 may connect to a transformer busbar 67 and may sense the voltage.

A transformer cradle 61 may be installed in the transformer compartment 60. The transformer cradle 61 may be fixedly installed onto a lower panel 60a of the transformer compartment 60 via bolts or the like. That is, when the bolt fixing the transformer cradle 61 thereto is loosened, the transformer cradle 61 may be separated from the switchboard.

The power transformer 65 may be carried on the transformer cradle 61 which in turn may be carried on a transfer vehicle 66 and then move into or out of the switchboard. The transformer cradle 61 may have a transformer cradle bushing 62.

The transformer busbar 67 may be introduced into the transformer cradle bushing 62. When the power transformer 65 is brought into an operation position, a transformer terminal 65a may be drawn into the transformer cradle bushing 62 and may directly contact and may be connected to the transformer busbar 67. In this connection, elastic means capable of exhibiting a contact pressure may be disposed at an end of the transformer terminal 65a.

That is, the transformer terminal 65a may directly contact and be connected to the transformer busbar 67 without coupling with a cradle terminal or a connecting busbar. Accordingly, the transformer cradle 61 may be taken out without a separate removal operation, and the transformer terminal 65a may be easily separated from the transformer busbar 67. Since the transformer terminal 65a does not come into contact with the transformer cradle bushing 62, insulation performance may be maintained.

FIG. 10 is a perspective view of a state in which a current transformer and a current transformer bushing are installed in a circuit breaker compartment from which a circuit breaker is removed, according to one embodiment according to the present disclosure. FIG. 11 is a front view of a state in which a current transformer and a current transformer bushing are installed in a circuit breaker compartment from which a circuit breaker is removed, according to one embodiment according to the present disclosure. FIG. 12 is a block diagram showing a combination relationship of a current transformer and a current transformer bushing shown in FIG. 10. FIG. 13 is a perspective view of a current transformer bushing according to an embodiment according to the present disclosure. FIG. 14 is a cut-away perspective view of a current transformer bushing shown in FIG. 13. FIG. 15 is a perspective view of a current transformer according to an embodiment according to the present disclosure. FIG. 16 is a front perspective view of a state in which a current transformer bushing is combined with a current transformer, according to one embodiment according to the present disclosure. FIG. 17 is a rear perspective view of a state in which a current transformer bushing is combined with a current transformer, according to one embodiment according to the present disclosure.

The current transformer bushing 31 may generally have a form of a pipe with a flange. The current transformer bushing 31 may include a bushing head 32, a bushing wing 33, and a bushing body 34.

The bushing head 32 may refer to a portion in which the main circuit terminal 91 of the circuit-breaker 90 and the switchboard terminal 42 are inserted and are connected to each other. The bushing head 32 may be formed in a shape of a hollow cylinder.

An inner space into which a portion of the switchboard terminal 42 and the main circuit terminal 91 are inserted may be formed in the bushing head 32. The main circuit terminal 91 may be inserted into the inner space and may be connected to the switchboard terminal 42. The bushing head 32 may act as a protector that protects portions of the main circuit terminal 91 and the switchboard terminal 42.

The bushing head 32 may have wrinkles on an outer circumferential surface thereof. The wrinkles formed on the outer circumferential surface of the bushing head 32 may have an effect of increasing a creepage distance.

The bushing wing 33 refers to a portion that may be supported on and engaged with the rear plate 30a of the circuit breaker compartment 30. The bushing wing 33 may protrude from the bushing head 32 and may constitute a flange.

The bushing wing 33 may be larger than the bushing head 32. The operator may couple the bushing wing 33 to the rear plate 30a of the circuit breaker compartment 30 using a bolt. The current transformer bushing 31 may be fixed to the rear plate 30a via the bushing wing 33. The bushing wing 33 may be positioned in front of the rear plate 30a of the circuit breaker compartment 30 such that an assembly operation may be performed inside the circuit breaker compartment 30.

An opening 31a may be formed in the current transformer bushing 31. The opening 31a may be formed in the bushing wing 33 of the current transformer bushing 31.

The opening 31a may have an elongated shape, and may pass through the wing 33 in the front-rear direction. The opening 31a may serve to expose the terminal 40a disposed on the current transformer 40 to an outside.

Thus, the operator may access the current transformer 40, more specifically the terminal 40a of the current transformer 40 through the opening 31a, without separating the current transformer bushing 31 from the current transformer 40. Thus, the operator may mount and separate and inspect wirings of the current transformer 40.

The opening 31a may be defined to face a top or bottom face of the bushing head 32.

The bushing body 34 may have a hollow cylindrical shape as in the bushing head 32. The bushing body 34 may have an outer diameter smaller than that of the bushing head 32. The bushing body 34 may to extend rearwards from the bushing wing 33.

The bushing body 34 may have wrinkles on at least a portion of an outer circumferential surface thereof. The wrinkles formed on the outer surface of the bushing body 34 may have an effect of increasing a creepage distance.

An electrical field-reducing sealed member sealed member 35 may be disposed inside the current transformer bushing 31. The electrical field-reducing sealed member 35 may be made of an aluminum wire mesh or the like. The electrical field-reducing sealed member 35 may be formed in a hollow cylindrical shape or an annular shape. The electrical field-reducing sealed member 35 may be integral with the current transformer bushing 31. The electrical field-reducing sealed member 35 may be disposed inside the bushing body 34. A section of the current transformer bushing 31 in which the electrical field-reducing sealed member 35 is installed may be longer than a section of the current transformer bushing 31 in which the current transformer 40 is installed. A length of the electrical field-reducing sealed member 35 in the front and rear direction may be larger than a length of the electrical transformer 40 in the front and rear direction.

In one example, an inner support 34a supporting the switchboard terminal 42 may be formed on the current transformer bushing 31. The inner support 34a may protrude from an inner circumference of the current transformer bushing 31. The inner support 34a may protrude along the inner circumferential surface of the bushing body 34. The inner support 34a may support the other end 42b of the switchboard terminal 42.

The other end 42b of the switchboard terminal 42 may contact and be supported on the inner support 34a. In more detail, the switchboard terminal 42 may be formed in a long rod shape. One end 42a of the switchboard terminal 42 may be coupled to the terminal bushing 41, while the other end 42b of switchboard terminal 42 may be supported by the inner support 34a. Thus, an entirety of the switchboard terminal 42 may be kept stable.

When the switchboard terminal 42 is inserted inside the bushing body 34, a remaining portion of the switchboard terminal 42 other than a portion thereof supported by the inner support 34a of the bushing body 34 may be spaced from the current transformer bushing 31. A tip of the switchboard terminal 42 may protrude into the bushing head 32 and may be connected to the main circuit terminal 91.

A guide spring 36 may be disposed in the current transformer bushing 31. The guide spring 36 may be positioned at a front end of the bushing body 34. The guide spring 36 may be made of aluminum. The electrical field-reducing sealed member 35 may be connected to the guide spring 36.

The guide spring 36 may be embodied as a circular spring having a ring shape and thus may be referred to as a guide ring. The guide spring 36 may be connected to the electrical field-reducing sealed member 35 and may be in contact with the switchboard terminal 42 to maintain an uniform electrical field between the switchboard terminal 42 and the electrical field-reducing sealed member 35.

Further, when assembling the current transformer bushing 31, the switchboard terminal 42 may be accommodated inside the current transformer bushing 31 due to an elastic force of the guide spring 36 and may be maintained at a correct position. This has an advantage that an assembly of the current transformer bushing 31 may be easier than using a general guide ring.

A grounding member (not shown) may be coupled to the guide spring 36. The grounding member may contact the switchboard terminal 42 to form a grounding circuit. The grounding member may be made of a leaf spring.

A semi-conductive layer 38 may be formed on an outer peripheral surface of the bushing body 34. The semi-conductive layer 38 may be formed by coating a semi-conductive material thereon. The semi-conductive layer 38 may be connected to a frame of the switchboard, such as the rear plate 30a of the circuit breaker compartment 30 via a conductor or the like, thereby to achieve an equipotential. The frame of the switchboard may be composed of a portion of the casing 100. Alternatively, the frame of the switchboard may be separate from the casing 100, and may be disposed inside casing 100. The frame of the switchboard may be installed on the casing 100 and may function as a supporter supporting various devices installed in the switchboard.

An inner face of the current transformer 40 may be connected to the switchboard terminal 42 via the electrical field-reducing sealed member 35. An outer face of the current transformer 40 may be grounded via the semi-conductive layer 38. Thus, insulation destruction due to corona phenomenon resulting from long-term use may be minimized.

The current transformer 40 may be engaged with the current transformer bushing 31. The current transformer 40 may surround the outer circumference of the current transformer bushing 31. In more detail, the current transformer 40 may be surround the outer circumference of the bushing body 34 of the current transformer bushing 31.

The current transformer 40 may be formed into an annular ring shape to surround the outer circumference of the current transformer bushing 31. The current transformer 40 may be embodied as a bushing-coupled current transformer.

The current transformer 40 may have at least one terminal 40a facing forwards. The terminal 40a may act as a secondary terminal of the current transformer 40. The terminal 40a may be fastened to or released from an electrical wire (not shown).

The current transformer 40 may include a flange 48 and a hollow portion 49.

The flange 48 may be fastened to the bushing wing 33 of the current transformer bushing 31. The terminal 40a may be disposed on the flange 48. The terminal 40a may be disposed on a front face of the flange 48.

The flange 48 and the bushing wing 33 may be in contact with each other. In more detail, the front face of the flange 48 may be mounted against a back face of the bushing wing 33. A current transformer coupler with and to which the front face of the flange 48 is in contact and fastened may be formed on a rear surface of the bushing wing 33. The current transformer 40 and the current transformer bushing 31 may be fastened to each other by fastening a member such as a bolt to the current transformer coupler (for example, a hole).

The terminal 40a of the current transformer 40 may overlap the opening 31a formed in the bushing wing 33 in the front-rear direction and may be exposed through the opening 31a to the operator in front of the switchboard.

The hollow portion 49 may extend rearwards from the flange 48. The hollow portion 49 may accommodate at least a portion of the bushing body 34 of the current transformer bushing 31.

When using the above configuration, a length in the front and rear direction of the current transformer 40 may be smaller than that of the conventional current transformer. Thus, an overall length of the switchboard in the front and rear direction may be shortened.

Hereinafter, an assembly method of the current transformer 40 and the current transformer bushing 31 according to an embodiment according to the present disclosure is described.

The enclosure 110 may be mounted on the rear face of the circuit breaker compartment 30. The terminal bushing 41 may be mounted to the terminal bushing mounter 71 formed on the back face of the enclosure 110 through the circuit breaker compartment 30.

Thereafter, the bushing body 34 of the current transformer bushing 31 may pass through the current transformer 40 so that a front face of the current transformer 40 contacts a back face of the bushing wing 33 of the current transformer bushing 31. A fastening member such as a bolt may be used to fasten the bushing wing 33 of the current transformer bushing 31 and the flange 48 of the current transformer 40 with each other.

Thereafter, the assembly of the current transformer bushing 31 and the current transformer 40 may be rearwards inserted through the circuit breaker compartment 30. The current transformer 40 may be inserted into the interference-preventing through-hole 30c, and the bushing wing 33 of the current transformer bushing 31 may be blocked by the rear plate 30a of the circuit breaker compartment 30.

Thereafter, the current transformer bushing 31 may be fastened to the current transformer bushing coupler formed on the rear plate 30a of the circuit breaker compartment 30 via a fastening member such as a bolt.

That is, conventionally, the current transformer and the current transformer bushing have to be inserted into and installed in the circuit breaker compartment, respectively. However, the current transformer bushing 31 according to one embodiment according to the present disclosure may be rearwards inserted into the terminal bushing 41 through the circuit breaker compartment 30 while being fastened to the current transformer 40. As a result, the number of assembly points between the current transformer bushing 31 and the current transformer 40 may be reduced, and the assembling may be easy.

An example of a maintenance process of the switchboard according to an embodiment according to the present disclosure is as follows.

First, the operator may open the circuit breaker compartment door 30b and withdraw the circuit-breaker 90. The circuit-breaker 90 may be taken out together with the circuit-breaker transfer vehicle carrying the circuit breaker thereon.

The operator may detach the assembly of the current transformer bushing 31 and the current transformer 40 from the rear plate 30a of the circuit breaker compartment 30 and remove the assembly in the forward direction.

The above descriptions are merely illustrative of the technical idea of the present disclosure. Those who have ordinary knowledge in the technical field to which the present disclosure belongs may realize various modifications and changes without departing from the essential characteristics of the present disclosure.

Therefore, the embodiments disclosed in the present disclosure are not intended to limit the technical idea of the present disclosure, but to illustrate the disclosure. The scope of the technical idea according to the present disclosure is not limited to the embodiments.

A scope of protection of the present disclosure should be interpreted based on the claims below. All technical ideas within an equivalent scope thereto should be interpreted as being included in a scope of rights of the present disclosure.

What is claimed is:

1. A switchboard comprising:
   a switchboard terminal;
   a current transformer bushing configured to be mounted to or removed from the switchboard through a circuit breaker compartment in a direction from a front face of the switchboard terminal to a rear face thereof, wherein the current transformer bushing surrounds the switchboard terminal; and
   a current transformer coupled to the current transformer bushing, wherein the current transformer surrounds an outer circumference face of the current transformer bushing,
   wherein the current transformer has at least one terminal facing in a front direction,
   wherein the current transformer bushing has an opening exposing the at least one terminal in the front direction.

2. The switchboard of claim 1, wherein the current transformer bushing includes:
   a bushing head;
   a bushing wing located in rear of the bushing head and having the opening defined therein; and
   a bushing body extending rearwards from the bushing wing.

3. The switchboard of claim 2, wherein the opening faces a top or bottom face of the bushing head.

4. The switchboard of claim 2, wherein the current transformer includes:
   a flange on which the at least one terminal is disposed; and
   a hollow portion extending rearwards from the flange, wherein a portion of the bushing body is accommodated in the hollow portion.

5. The switchboard of claim 4, wherein the flange is fastened to the bushing wing.

6. The switchboard of claim 5, wherein the at least one terminal is disposed on a front face of the flange,
   wherein the front face of the flange contacts a rear face of the bushing wing.

7. The switchboard of claim 2, wherein the bushing body receives therein an electrical field-reducing sealed member, and a guide spring connected to the electrical field-reducing sealed member.

8. The switchboard of claim 7, wherein the guide spring is disposed at a front end of the bushing body.

9. The switchboard of claim 7, wherein the guide spring contacts the switchboard terminal to fix a position of the switchboard terminal.

10. The switchboard of claim 2, wherein the bushing wing protrudes from the bushing head and constitutes a flange.

11. The switchboard of claim 1, wherein the at least one terminal and the opening overlap each other in a front-rear direction.

12. The switchboard of claim 1, wherein while the current transformer bushing is coupled to the current transformer, the current transformer bushing is inserted into a terminal bushing through the circuit breaker compartment in a direction from a front face of the switchboard terminal to a rear face thereof.

13. The switchboard of claim 1, wherein the current transformer coupled to the current transformer bushing further comprises:
- a flange having at least one terminal disposed on a front face thereof, wherein the flange contacts a bushing wing of a current transformer bushing; and
- a hollow portion extending rearwards from the flange, wherein at least a portion of a bushing body of the current transformer bushing is configured to be accommodated in the hollow portion.

\* \* \* \* \*